(12) United States Patent
Wang et al.

(10) Patent No.: US 9,865,257 B2
(45) Date of Patent: Jan. 9, 2018

(54) DEVICE AND METHOD FOR A SPOKEN DIALOGUE SYSTEM

(71) Applicant: Kabushiki Kaisha Toshiba, Minato-ku (JP)

(72) Inventors: Zhuoran Wang, Cambridge (GB); Yannis Stylianou, Cambridge (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/142,386

(22) Filed: Apr. 29, 2016

(65) Prior Publication Data
US 2016/0322050 A1 Nov. 3, 2016

(30) Foreign Application Priority Data

Apr. 30, 2015 (GB) .................................... 1507403.2

(51) Int. Cl.
| | |
|---|---|
| *G10L 15/22* | (2006.01) |
| *G06Q 10/06* | (2012.01) |
| *G06F 17/27* | (2006.01) |
| *G10L 13/02* | (2013.01) |
| *G10L 15/18* | (2013.01) |

(52) U.S. Cl.
CPC ............ *G10L 15/22* (2013.01); *G06F 17/279* (2013.01); *G06Q 10/06393* (2013.01); *G10L 13/02* (2013.01); *G10L 15/18* (2013.01)

(58) Field of Classification Search
CPC ..................................................... G10L 15/22
See application file for complete search history.

(56) References Cited

U.S. PATENT DOCUMENTS

| | | | |
|---|---|---|---|
| 2012/0053945 A1* | 3/2012 | Gupta .................... | G10L 15/22 704/256 |
| 2013/0257164 A1* | 10/2013 | Garrity ................... | H02J 3/383 307/82 |

(Continued)

FOREIGN PATENT DOCUMENTS

| | | |
|---|---|---|
| JP | 2013-517566 A | 5/2013 |
| WO | WO02/35376 A2 | 5/2002 |

OTHER PUBLICATIONS

Search Report dated Oct. 27, 2015 in United Kingdom Patent Application No. GB 1507403.2.

(Continued)

*Primary Examiner* — Douglas Godbold
(74) *Attorney, Agent, or Firm* — Oblon, McClelland, Maier & Neustadt, L.L.P.

(57) ABSTRACT

A controller for a dialog manager, the dialog manager being configured to receive a representation of an input utterance from a user and control the flow of conversation with the user. The controller is configured to implement a parameterized policy for defining the behavior of a dialog manager. The parameterized policy is configured to operate with an ontology-independent parameter as an input. The controller has a processor for parameterizing an end user ontology such that the parameterized policy can define the behavior of a dialog manager for the end user ontology. The processor is configured to define a slot of the end user ontology in terms of at least one of the ontology-independent parameters such that it is suitable for being used as an input to the parameterized policy.

15 Claims, 5 Drawing Sheets

(56) References Cited

U.S. PATENT DOCUMENTS

| | | | | |
|---|---|---|---|---|
| 2013/0275164 | A1* | 10/2013 | Gruber | G10L 17/22 705/5 |
| 2014/0278413 | A1* | 9/2014 | Pitschel | G10L 15/063 704/243 |
| 2014/0309990 | A1* | 10/2014 | Gandrabur | G10L 15/1815 704/9 |
| 2015/0142704 | A1* | 5/2015 | London | G06N 5/04 706/11 |
| 2015/0179170 | A1* | 6/2015 | Sarikaya | G10L 15/22 704/275 |
| 2015/0193379 | A1* | 7/2015 | Mehta | G10L 15/00 704/9 |
| 2016/0163312 | A1* | 6/2016 | Henton | G10L 15/22 704/270.1 |
| 2016/0313868 | A1* | 10/2016 | Weng | G06F 3/017 |

OTHER PUBLICATIONS

Zhuoran Wang, et al. "A Simple and Generic Belief Tracking Mechanism for the Dialog State Tracking Challenge: On the believability of observed information" Proceedings of the SIGDIAL 2013 Conference, Metz, France, Aug. 22-24, 2013, pp. 423-432.

M. Găsić, et al., "POMDP-based dialogue manager adaptation to extended domains" SIGDIAL, http://mi.eng.cam.ac.uk/~mg436/papers/gp_adapt_revised.pdf, 2013, 9 Pages.

M. Găsić, et al., "Incremental on-line adaptation of POMDP-based dialogue managers to extended domains" Interspeech, http://mi.eng.cam.ac.uk/~mg436/papers/gktb14.pdf, 2014, 5 Pages.

M. Găsić, et al., "Distributed Dialogue Policies for Multi-Domain Statistical Dialogue Management" ICASSP, http://mi.eng.cam.ac.uk/~mg436/papers/distributed-dialogue-policies-errata.pdf, 2015, 5 Pages.

Jason D. Williams, et al., "Scaling Up POMDPs for Dialog Management: The "Summary POMDP" Method" http://research.microsoft.com/pubs/160937/williams2005scalingup.pdf, 2005, 6 Pages.

Takafumi Nozue, et al., "Development of HIS-POMPD learning and evaluation prototype tool for spoken dialogue control," 64 times Language / Speech Understanding and Dialogue Process Study Seminar Artificial Intelligence Society study materials, Mar. 15, 2012, (SIG-SLUD-B103), pp. 21-26 (with machine-generated English translation).

* cited by examiner

DEVICE AND METHOD FOR A SPOKEN DIALOGUE SYSTEM

FIELD

Embodiments described herein relate generally to spoken dialogue systems (SDS).

BACKGROUND

Spoken dialogue systems are intended to verbally interact with humans and are becoming increasingly prevalent, in particular in mobile applications and wearable speech interface devices.

Spoken dialogue systems generally comprise a number of components to, for example, convert a human user's speech into text, identify and collate semantic information, control the flow of the conversation in order to acquire the necessary information to complete the task, generate the necessary text and synthesize speech. Dialogue managers are often responsible for the state and flow of the conversation between the spoken dialogue system and the user.

A dialogue manager is traditionally tailored to work in a specific domain. The domain will generally be specific to the type and purpose of the spoken dialogue system, for example a system to provide the user with a number of restaurants which match certain criteria, or a system to identify a suitable laptop for a buyer.

The domain will often have a domain-specific ontology which comprises the types, properties and interrelationships of the entities specific to that domain. In many task-oriented spoken dialogue systems the ontology will specify a plurality of slots to be filled with one (or multiple) of a plurality of possible values. The dialogue manager will generally comprise a policy designed to control the flow of the conversation to fill slots with a value in order to complete the task.

In order to increase the efficiency and effectiveness of a spoken dialogue system, the policy will be optimised for the domain and ontology with which it operates. This is often done using data-driven policy adaptation processes, e.g. using the spoken dialogue system with a user or a simulated user and adapting the policy to increase at least one of the success rate or average reward over a value for an unadapted policy. This is a time consuming and expensive process. Moreover, in many cases a basic (e.g. rule-based) working SDS will be required before the data collection procedure can be started. Developing the initial system for a new domain requires a significant amount of human expertise.

As the ontology is generally domain-dependent, a policy optimised for a first domain is traditionally not compatible with, or not optimised for, a second domain. This means that a policy must be optimised for every domain independently. This can be an expensive and time consuming exercise and means an optimised dialogue manager cannot be provided for a domain without first spending a significant amount of time and money optimising it to the specific ontology of that domain.

BRIEF DESCRIPTION OF THE DRAWINGS

Methods and devices in accordance with non-limiting embodiments will now be described with reference to the accompanying figures in which.

DETAILED DESCRIPTION

Figure 1:
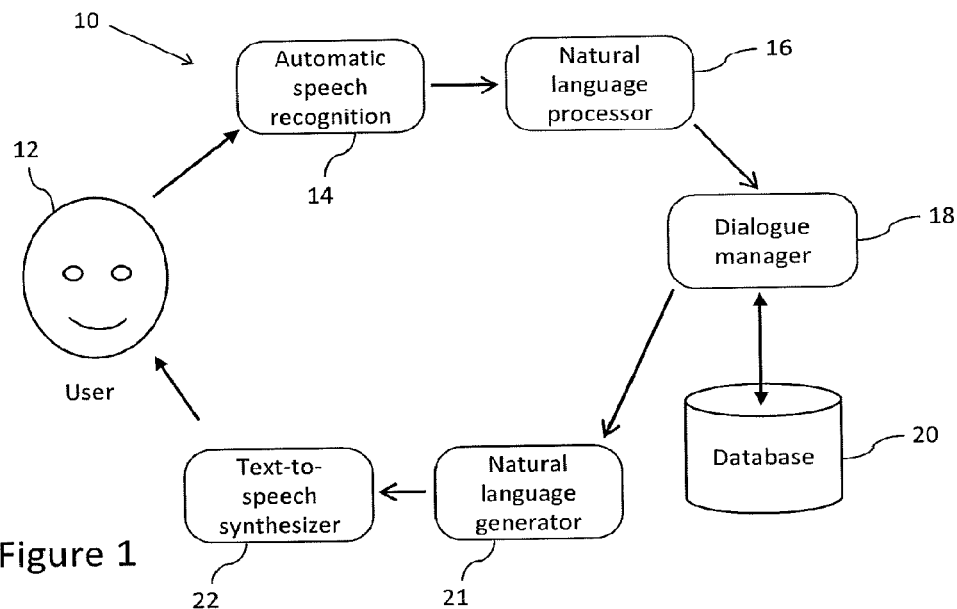
FIG. 1 is a flow chart schematically illustrating a SDS system.

In an embodiment a controller for a dialogue manager is provided, the dialogue manager being configured to receive a representation of an input utterance from a user and control the flow of conversation with the user; wherein the controller is configured to implement a parameterised policy for defining the behaviour of a dialogue manager; wherein the parameterised policy is configured to operate with an ontology-independent parameter as an input; and the controller comprises: a processor for parameterising an end user ontology such that the parameterised policy can define the behaviour of a dialogue manager for the end user ontology; wherein the processor is configured to: define a slot of the end user ontology in terms of at least one of the ontology-independent parameters such that it is suitable for being used as an input to the parameterised policy.

A controller for a dialogue manager may be configured to dictate the dialogue manager's behaviour. A SDS may comprise a dialogue manager and the dialogue manager may implement a policy in order to determine the actions to be taken by the SDS. The dialogue manager may comprise an input. The dialogue manager may comprise an output. The dialogue manager may receive, as an input, a representation of a human utterance. This may be a semantic representation of a human utterance, or a collection of data representing information extracted from a human utterance. The dialogue manager may receive this representation from a semantic decoder. The dialogue manager may output an instruction as to which action is to be taken. An action describes what the SDS does at its next turn in the dialogue. The choice of which action to take may depend on a number of factors, such as the last observation, the full dialogue history and also the context. The output of the dialogue manager may be a semantic representation. The dialogue manager may output its instructions to a natural language generation unit.

A dialogue manager or the controller may be configured to implement a parameterised policy. A dialogue manager or the controller may comprise a processor that is configured to implement a parameterised policy. The dialogue manager may comprise a memory unit. A dialogue manager or the controller may comprise, or store a parameterised policy on a memory unit.

The policy may define the behaviour of the controller and, as such, a dialogue manager. The policy may be responsible for selecting which actions should be taken by a dialogue manager. The policy may do this by defining a probability distribution over which actions might be taken.

An ontology defines the different entities and interrelationships of a domain. A domain defines a specific area or topic of relevance. The ontology is therefore domain-dependent and different domains have different ontologies. In many task-orientated spoken dialogue systems, the ontology comprises a series of slots, which need to be filled with a value in order to identify which results stored in a database meet the user's criteria. An ontology may comprise a plurality of slots.

The slots of the ontology are traditionally used as inputs in the policy, allowing the policy to determine which action should be taken. As such, the policy is tailored for, and dependent on, the ontology and therefore domain.

A policy according to an embodiment may be ontology, and therefore domain, independent. A policy according to an embodiment is configured to operate with ontology independent parameters. In a policy according to an embodiment, instead of inputs unique to the domain, the policy may be configured to receive and operate with a single, or a plurality of ontology-independent parameters. In a policy according to an embodiment, instead of slots, the policy may be configured to receive and operate with a single, or a plurality of ontology-independent parameters. In a policy according to an embodiment, instead of full belief states or domain-dependent summary beliefs, the policy may be configured to receive and operate with a single, or a plurality of ontology-independent parameters. The ontology-independent parameters may be numerical parameters. The ontology-independent parameters operated on by the policy may be a series, string or matrix of numbers representing certain ontology-independent parameters.

An ontology-independent parameter may comprise a definition or equation. When applied to a slot or a belief state, the parameter may be a number, vector or distribution. This number, vector or distribution may be used as an input for a parameterised policy.

A slot or belief state defined in terms of parameters may comprise a parameter-quantity or a plurality of parameter-quantities. For example, a parameter may be determined by the number of possible values a slot can take, N. The parameter may be an equation using N as an operand. When applied to a slot, N will be used to produce a value; this value may be a parameter-quantity, which may be a number, vector or distribution. The parameterised policy may be configured to operate with a parameter-quantity as its input.

The ontology-independent parameters may be defined to allow slots of one ontology to effectively be compared to slots of a different ontology, via an ontology-independent space. The ontology-independent parameters may be properties of a slot which can be measured, calculated, determined or estimated for a plurality of different slots belonging to a plurality of different ontologies.

Ontology-independent parameters may make the similarities between slots of different ontologies quantitatively measurable. Once an ontology-independent policy has been optimised in one domain using data-driven approaches, the obtained policy (i.e. the learnt model parameters) provides prior knowledge (or mathematically a prior distribution) for the policy in a different domain with a different ontology, providing that the same policy model and same ontology parameterisation are used for the new ontology.

The same ontology-independent parameters may be used to parameterise an ontology used to optimise a policy and an end user policy.

A policy configured to operate with ontology-independent parameters may be able to define the behaviour of a dialogue manager based on inputs which are not specific or dependent on the ontology with which it is working. A parameterised policy may be a policy configured to operate on parameters. A parameterised policy may be configured to receive representations of slots and/or belief states, defined in terms of parameters, as inputs. As such, a specific parameter-value may be determined for an, or each, parameter (and optionally for each slot) and the parameterised policy may be configured to operate with these specific parameter-values.

It is to be understood that while a parameterised policy is configured to operate with an ontology-independent parameter as an input, the parameterised policy may be configured to operate with a plurality of parameters as inputs. A slot of an ontology or a belief state may be defined in terms of a plurality of ontology-independent parameters, respectively.

The controller may comprise a processor. The processor may be for processing the end user ontology to allow the ontology to be compatible with, or provide an input for, a parameterised policy. An end user ontology may be the ontology with which the dialogue manager is intended to work, i.e. the ontology for which the policy is being set up for. The end user ontology is that of the domain with which the SDS is to work with.

The processor may act as a 'parameteriser': defining the slots of the ontology in terms of the ontology-independent parameters. Defining a slot of an ontology in terms of parameters may be construed to include converting a slot into ontology-independent parameters and representing a slot in terms of ontology independent parameters. The processor may also act as a 'parameteriser' for a belief state.

The end user ontology itself may not be modified or altered in any way. The processor may calculate or determine the appropriate value for a parameter for a specific slot of the end user ontology, and this may be used as an input, or as part of an input, for the policy.

The controller may comprise a memory unit. The memory unit may store the definitions of the ontology independent parameters. The memory unit may store data regarding the belief state of the spoken dialogue system.

The processor may be configured to define a slot of the end user ontology, a plurality of slots of the end user ontology, or each slot of the end user ontology in terms of the ontology-independent parameters.

The parameterised policy may be optimised for a first ontology; wherein optimising a policy comprises adapting the policy for an ontology to increase at least one of the success rate or average reward over a value for an unadapted policy.

The first ontology may be different to the end user ontology.

The parameterised policy may be optimised with a first ontology. The parameterised policy may be optimised by using a data-driven policy adaptation process with respect to a first ontology.

To optimise the policy for a first ontology, a slot of the first ontology may be defined in terms of at least one of the ontology-independent parameters such that it is suitable for being used as an input to the parameterised policy. Each of the slots of the first ontology may be defined in terms of at least one of the ontology-independent parameters.

The parameterised policy may be optimised for a policy before being used with the end user ontology. The policy may be optimised before it is implemented or deployed in a controller, dialogue manager or SDS for use with the end user ontology.

The parameterised policy uses parameters as inputs and the parameters may be used to define a parameter 'space' where slots of different ontologies may be objectively mapped or compared. As such, a policy optimised for a first ontology may also thereby be optimised for an end user ontology.

In optimising the policy for or with a first ontology, the policy may be optimised for the ontology-independent parameters. In optimising a policy with or for a first ontology, the policy may be being optimised for using ontology-independent parameters as inputs.

Optimising a policy may comprise maximising a certain performance indicator for this specific domain and ontology, or increasing a performance indicator over an initial value. Optimisation of a policy may comprise adapting the policy to increase the success rate or the average reward. Optimisation may comprise adapting a policy such that the mean average, or a combination of the above indicators is maximised.

The optimisation process may be a function approximation procedure.

The optimisation process may comprise repeatedly using a dialogue manager comprising or implementing the policy to run through a dialogue with a human or a simulated human. In combination with, or in response to the dialogues with a real or simulated human, the policy may be adapted to increase a performance indicator as described above. As the policy needs to be used lots of times, typically thousands, this is an expensive and time consuming exercise.

Dialogue policy optimisation may be aimed at estimating the expected long-term reward for a system action being executed at a system state or belief state, such that the action with maximum expected reward can be selected at each dialogue turn.

A full system action is defined in one of the following forms: a( ); a(s); a(s-v); a(s=$v_1$, s-$v_2$); a($s_1$=$v_1$, $s_2$=$v_2$, . . . ) where a is a communicative function that is domain and ontology independent and $s_i$ and $v_i$ are slot-value pairs defined by the domain ontology. In practice, since the number of full system actions can be exponentially large (comprising all possible slot-value combinations), a common strategy in SDS is to simplify the full system actions to so-called summary actions, where (1) if an action only takes one slot-value pair as its operand, the actual value is eliminated and the action is summarised as a(s=<current/top value hypothesis in slot s>), (2) if an action takes two values pairs sharing a common slot as its operand, it is summarised as a(s=<current/top value hypotheses in slot s>, s=<second last/second probable value hypotheses in slot s>) and (3) if an action takes a list of slot-values as its operand, it is summarised as a(<current/top joint slot-value hypothesis>), i.e. the current (if deterministic states are used, i.e. in Markov Decision Process SDS) or the top belief (if belief states are used, e.g. in Partially Observable Markov Decision Process SDS) hypothesis (or the latest or top two hypotheses if necessary) is substituted into the < > above.

An example of an optimisation process is the Gaussian Process Temporal Difference (GPTD). This optimisation process may be used with embodiments of the present disclosure.

Policy learning, i.e. optimisation of a policy is to assign a parameter $\theta_a$ (e.g. a weight vector if linear model is the case) for each action a. In this specific discussion a is used to denote a full action, and use a(s) to denote a summary action that is uniquely derived from a, where a is the action type (which is formally called a communication function, e.g. 'inform', 'request', 'confirm', etc.) and s is the slot that a depends on (it can be null if a doesn't have any slot-value argument, or a depends on the joint belief, hence doesn't depend on any specific slot).

In conventional methods, a separate $\theta_{a,s}$ needs to be learned and stored for each valid combination of (a,s). But in the proposed method, as the slots s are parameterised as the input of the policy model, it is only needed to learn and store a policy model parameter (weight) $\theta_a$ for each communication function. In other words, all the previous a(s) that have the same a but different s will share the same policy model parameter (weight) $\theta_a$. As such, the output of the policy optimisation technique of the present disclosure has a slightly different data structure (fewer number model parameters).

A controller may comprise an ontology parameteriser for parameterising an end user ontology such that the parameterised policy can define the behaviour of a dialogue manager for the end user ontology. The ontology parameteriser may comprise a processor. The ontology parameteriser or processor may be configured to define a slot of the end user ontology in terms of at least one of the ontology-independent parameters such that it is suitable for being used as an input to the parameterised policy.

A controller may comprise a belief parameteriser for parameterising a belief state such that the parameterised policy can define the behaviour of a dialogue manager for an end user ontology. The belief parameteriser may comprise a processor. The ontology parameteriser or processor may be configured to define a belief state in terms of at least one of the ontology-independent parameters such that it is suitable for being used as an input to the parameterised policy.

An ontology-independent parameter may be a numerical entity. An ontology-independent parameter may be a variable, a distribution or a vector.

Where a parameter is said to be determined by an entity, the entity may be used as an operand to determine a parameter-quantity for inputting into the parameterised policy as an input.

A value is a possible valid response that the dialogue manager can recognise in relation to a slot. For example, in a domain restaurants, a slot may be price and possible values may be low, mid, and high.

The definition of an ontology-independent parameter may be determined by or related to how each slot is related to completing the underlying task.

An ontology-independent parameter may be determined by the number of possible values for the slot of the end user ontology.

An input for inputting into the ontology-independent policy may be determined by the number of possible values for the slot of the end user ontology. For the above example, the number of possible values for the slot price in the domain restaurants is 3.

An ontology-independent parameter may be dependent on the number of possible values for the slot of the end user ontology.

An input for inputting into the ontology-independent policy may be proportional to, or inversely proportional to, the number of possible values for the slot of the end user ontology.

An ontology-independent parameter may be determined by whether the slot of the end user ontology must be filled for the parameterised policy to meet a user's requirements.

An input for inputting into the ontology-independent policy may be determined by (e.g. take a specific value depending on) whether obtaining a value for the respective slot is compulsory in order to complete the task, e.g. return a list of restaurants meeting the user's criteria to the user.

An ontology-independent parameter may be determined by the priority of the slot of the end user ontology.

An ontology-independent parameter may be determined by the likely position in a dialogue at which the slot will be requested or referenced by a user.

An input for inputting into the ontology-independent policy may represent the importance assigned to a specific slot. The processor may be configured to determine this importance, or it may be defined by a user.

The controller may comprise a database, alternatively or additionally, the processor may be configured to receive data from a database. The database may store data regarding the belief state, the ontology slots, the ontology values or results for the ontology.

A result may be an entity, identified by the dialogue manager as meeting a client's requirements (e.g. a Chinese restaurant in the centre of town that is low cost). The policy may be configured to identify a number of results to output to the user. The controller, dialogue manager and spoken dialogue system may be configured to identify a number of results to output to the user. This number of results may need to be below a threshold number of results. This threshold may be determined by the policy, or set by a user. Results may be embodied as slots of the ontology, or values for a slot of the ontology.

The processor may be configured to receive data from a database; and the determination of the ontology-independent parameter may be dependent on the data from the database.

The processor may be configured to receive data from a database; and the determination of the ontology-independent parameter may be determined by the data from the database.

The controller may comprise an input for receiving data from a database, and the processor may be configured to receive data from the database. The database may be a memory unit. The controller may comprise a memory unit or database. The database may comprise ontology-specific data, such as the slots, values for each slot and information regarding the slots. The database may comprise data regarding the possible results that may be output as part of, or in response to, the dialogue (e.g. restaurants which meet a user's criteria).

An input for inputting into the ontology-independent policy may be determined by, or influenced by, data received from a database.

The data from the database may comprise the entropy of the value distribution for the slot of the end user ontology; and an ontology-independent parameter may be determined by the entropy of the value distribution for the slot.

An input for inputting into the ontology-independent policy may represent the entropy of the value distribution for the slot.

An ontology-independent parameter may be proportional to, or inversely proportional to, the entropy of the value distribution for the respective slot. The entropy of the value distribution for the respective slot may be assigned to one of a plural of entropy-range bins to determine the ontology-independent parameter.

The policy may be configured to identify a number of results, equal to or below a threshold number of results, as meeting a user's criteria; the data from the database may comprise the proportion of the values for the slot which, if selected, would result in a number of results equal to, or below, a threshold number of results being identified as meeting the user's criteria; and an ontology-independent parameter may be determined by on this data.

The data by which an ontology-independent parameter is determined may be the proportion of the values for the slot which, if selected, would result in the number of results being equal to or below the threshold number.

A policy according to any embodiment described herein may be configured to identify a number of results equal to, or below a threshold number of results as meeting a user's criteria.

An ontology-independent parameter may be determined by the current belief state.

It is to be understood that where a parameter is said to be determined by an entity, the entity may not be the only operand of influencing factor in determining the parameter. As such, 'determined by' does not necessarily mean solely determined by. Where it is said that a parameter is determined by an entity, the parameter may be dependent on, proportional to, inversely proportional to or otherwise related to the entity.

Examples of possible ontology-independent parameters include the following:
- 1/N, where N is the number of values that the slot has (i.e. can take);
- allocating one of six binary-bins according to min{int $[\log_2(N)],6$}, where N is the number of values that the slot has, e.g. a slot where N=8 would be allocated the following parameter: $\lfloor 0,0,1,0,0,0 \rfloor$;
- a binary indication of whether the slot must be filled in order to complete the task or satisfactorily meet the user's criteria (0=no, 1=yes);
- a binary indication of whether the slot is optional (0=no, 1=yes);
- an indication of the priority of the slot, as a scale of {1,2,3} mapped to {$\lfloor 1,0,0 \rfloor, \lfloor 0,1,0 \rfloor, \lfloor 0,0,1 \rfloor$};
- the entropy of the value distribution in the database for the slot;
  - e.g. DB(s=v) to denotes the set of entities in the database that have the attribute s=v, and |DB(s=v)| and |DB| denote the size of the above set and the size of the database respectively, Calculating |DB(s=v)|/|DB| for each possible value v of the slot s produces a discrete distribution (a normalised histogram). The entropy may be computed for this normalised histogram.
- if the slot is filled, in conjunction with the current top joint hypothesis:
  - proportion of the slot's values resulting in obtained results in the database above a threshold number;
  - proportion of the slot's values resulting in obtained results in the database below a threshold number;
  - proportion of the slot's values resulting in obtained results in no results in the database meeting the user's criteria;
- this parameter will only be non-zero for slots whose current top hypothesis in the belief is null, in other words, when the system believes it hasn't observed any constraints for those slots yet.

The policy may be configured to receive a plurality of ontology-independent parameters for each slot or belief state. As such, a slot or belief state may be defined in terms of a plurality of ontology-independent parameters. A slot or belief state may be defined in terms of 5, 10 or more than 10 ontology-independent parameters. A slot or belief state may be defined in terms of all of the above ontology-independent parameters.

The processor may be for parameterising an end user ontology and a belief state such that the parameterised policy can define the behaviour of a dialogue manager for the end user ontology; and wherein the processor may be further configured to: define a belief state in terms of at least one of the ontology-independent parameters such that it is suitable for being used as an input to the parameterised policy.

A belief state may be defined in terms of a plurality of parameters.

Ontology-independent parameters may be for defining a belief state and a slot of an ontology such that they can be used as inputs for a parameterised policy. A parameterised policy may be configured such that it can receive parameters defining a slot of an ontology or a belief state.

Defining the belief state in terms of ontology-independent parameters may reduce the number of dimensions compared to the full belief state. Defining the belief state in terms of ontology-independent parameters may convert the belief state into a lower dimensional form. Defining the belief state in terms of ontology-independent parameters makes the belief state domain independent.

A belief state may comprise or represent all of the system's observations in the dialogue sequence, wherein an observation is an input to the system. As such, a belief state may track, comprise or be determined by all of the preceding inputs to the system made by a user in the dialogue sequence. A belief state therefore may provide a full dialogue history and context.

A belief state may be received from a dialogue state tracker. A belief state may be stored in a memory unit in the controller. The processor may be configured to receive a belief state. The definition of a belief state in terms of ontology-independent parameters may be stored in a memory unit in the controller.

A belief state may be a discrete distribution. A belief state may be updated or created every time a new observation is made by the system. The processor may be configured to define a belief state in terms of an ontology-independent parameter (or multiple ontology-independent parameters) every time the belief state is updated. The processor may be configured to update the definition of a belief state every time the belief state is updated.

There may be a first set of ontology-independent parameters for defining a slot of an ontology and a second set of ontology-independent parameters for defining a belief state. The first set may be different to the second set. The first and second set may be mutually exclusive.

A parameterised policy may be configured to operate with a first ontology-independent parameter or a first set of ontology-independent parameters and a second ontology-independent parameter or second set of ontology-independent parameters. The first parameter or set of parameters may be for defining a slot of an ontology. The second parameter or set of parameters may be for defining a belief state.

An ontology-independent parameter for defining a belief state may be determined by the maximum probability in the belief state (i.e. the probability corresponding to the top hypothesis).

An ontology-independent parameter for defining a belief state may be determined by the entropy of the distribution.

An ontology-independent parameter for defining a belief state may be determined by the probability difference between the top two hypotheses (in an example implementation this value may be discretised into 5 bins with interval size 0.2).

An ontology-independent parameter for defining a belief state may be determined by a non-zero rate, e.g. proportion of the elements in the belief state that have non-zero probabilities.

It is to be understood that where a parameter is said to be determined by an entity, the entity may not be the only operand of influencing factor in determining the parameter. As such, 'determined by' does not necessarily mean solely determined by.

Where it is said that a parameter is determined by an entity, the parameter may be dependent on, proportional to, inversely proportional to or otherwise related to the entity.

The processor may be further configured to apply the parameterised policy to define the behaviour of a dialogue manager operating in a domain with the end user ontology; the dialogue manager may be configured to receive a representation of an input utterance from a user and control the flow of conversation with the user.

The processor may be further configured to refine the parameterised policy for the end user domain using a data-driven policy adaptation process; wherein a data-driven policy adaptation process may comprise: using the dialogue manager operating in a domain with the end user ontology with at least one user or simulated user and adapting the parameterised policy to increase at least one of task success rate and average reward.

Refining the parameterised policy may comprise adapting the parameterised policy to increase at least one of the success rate or average reward over a value for an unrefined policy.

A policy may be refined using a method as described above in relation to optimising a policy. Refining a policy and optimising a policy may use the same process. In order to refine the selected policy it is repetitively used with the end user ontology, rather than a further, unrelated ontology. As a policy that is being refined may have already been optimised, the number of iterations of the dialogue with a user or computer simulated user may be significantly reduced compared to a policy that has not been optimised in such cases.

When used together with a domain-independent dialogue state tracker (DST), the proposed method may yield a domain-independent dialogue manager.

A method according to an embodiment may comprise any of the actions that a controller or processor according to an embodiment is configured to undertaken.

According to an embodiment is a method for providing an optimised, ontology-independent policy for a dialogue manager configured to receive a representation of an input utterance from a user and control the flow of conversation with the user, the method comprising: providing a parameterised policy for defining the behaviour of a dialogue manager, wherein the parameterised policy is configured to operate with ontology-independent parameters as inputs; and optimising the parameterised policy for a first ontology; wherein a slot of the first ontology is defined in terms of at least one of the ontology-independent parameters such that it is suitable for being used as an input to the parameterised policy; and optimising the parameterised policy comprises: adapting the parameterised policy for a specific ontology to increase at least one of the success rate or average reward over a value for an unadapted policy. The method may be for optimising a policy.

A belief state may be defined in terms of ontology-independent parameters.

In a method according to an embodiment a belief state of a spoken dialogue system for the first ontology may be defined in terms of at least one of the ontology-independent parameters such that it is suitable for being used as an input to the parameterised policy.

According to a further embodiment, a method for optimising a policy may comprise optimising a parameterised policy for a first ontology; wherein the parameterised policy is configured to operate with ontology-independent parameters as inputs; wherein a slot of the first ontology is defined in terms of at least one of the ontology-independent parameters such that it is suitable for being used as an input to the parameterised policy; and optimising the parameterised policy comprises adapting the parameterised policy for a specific ontology to increase at least one of the success rate or average reward over a value for an unadapted policy. A belief state may be defined in terms of ontology-independent parameters.

A method may comprise providing a parameterised policy for defining the behaviour of a dialogue manager, wherein the parameterised policy is configured to operate with ontology independent parameters as inputs.

The method may further comprise: parameterising an end user ontology; wherein parameterising an end user ontology comprises: defining a slot of the end user ontology in terms of at least one of the ontology-independent parameters, such that it is suitable for being used as an input to the parameterised policy.

The method may further comprise: applying the parameterised policy to define the behaviour of a dialogue manager operating in a domain with the end user ontology; wherein the dialogue manager is configured to receive a representation of an input utterance from a user and control the flow of conversation with the user; the method further comprising: refining the parameterised policy for the end user domain using a data-driven policy adaptation process; wherein a data-driven policy adaptation process comprises: using the dialogue manager operating in a domain with the end user ontology with at least one user or simulated user and adapting the parameterised policy to increase at least one of task success rate, average reward or mean of the two.

The method may further comprise: providing a further parameterised policy configured to operate with ontology-independent parameters as inputs; and optimising the further parameterised policy for a second ontology; wherein a slot of the second ontology is defined in terms of at least one of the ontology-independent parameters such that it is suitable for being used as an input to the further parameterised policy; and optimising the further parameterised policy comprises: adapting the parameterised policy for a specific ontology to increase at least one of the success rate or average reward over a value for an unadapted policy; and the method further comprises: testing the parameterised policy and further parameterised policy in a dialogue manager for an end user ontology to identify the most optimal parameterised policy for the end user ontology; wherein the dialogue manager is configured to receive a representation of an input utterance from a user and control the flow of conversation with the user; and the most optimal parameterised policy is that which has the highest success rate, average reward value or mean of the two.

The parameterised policy and further parameterised policy may be tested in a dialogue manager with, or using, or adapted for an end user ontology.

The method may comprise providing, optimising and testing a plurality of further policies.

Further parameterised policies may be provided, in order to provide a plurality of policies that may be used with the end user ontology. All of the provided policies may be optimised with respect, or for, an ontology. The ontologies with which the provided policies are optimised may all be the same, or different. The ontologies with which the provided policies are optimised may not be the end user ontology. The most optimal, or best ontology may then be selected for use with the end user ontology.

Discussion relating to actions for which a controller or processor are configured to take relates, mutatis mutandis, to equivalent method steps according to an embodiment. As such, discussion relating to analogous features and method steps applies to all embodiments of the present disclosure equally i.e. both devices and methods.

According to an embodiment is a method for making an ontology compatible with an ontology-independent policy, wherein an ontology-independent policy is configured to operate with ontology-independent parameters as inputs and is for defining the behaviour of a dialogue manager for a plurality of ontologies, the dialogue manager being configured to receive a representation of an input utterance from a user and control the flow of conversation with the user; the method comprising: parameterising an ontology; wherein parameterising an ontology comprises: defining a slot of the ontology in terms of at least one ontology-independent parameter.

The method may further comprise: parameterising a belief state; wherein parameterising a belief state comprises: defining a belief state in terms of at least one of the ontology-independent parameters such that it is suitable for being used as an input to the parameterised policy.

The method may further comprise providing an ontology-independent ontology as described above.

According to an embodiment is a policy for defining the behaviour of a dialogue manager, the dialogue manager being configured to receive a representation of an input utterance from a user and control the flow of conversation with the user; wherein the policy is configured to operate with ontology-independent parameters as inputs.

The policy may be optimised for a first ontology; wherein a policy is optimised by adapting it for a specific ontology to increase at least one of the success rate or average reward over a value for an unadapted policy. A, or each, slot of the specific ontology may be defined in terms of ontology-independent parameters.

According to an embodiment a dialogue manager is provided that is configured to receive a representation of an input utterance from a user and control the flow of conversation with the user comprising a controller according to an embodiment.

The dialogue manager may comprise a domain-independent dialogue state tracker.

According to an embodiment is a computer readable carrier medium carrying computer executable instructions which, when executed on a processor, cause the processor to carry out a method according to the embodiment.

Present embodiments may be for use in a Partially Observable Markov Decision Process SDS (POMDP-SDS). POMDP is a powerful tool for modelling sequential decision making problems under uncertainty, by optimising the policy to maximise long-term cumulative rewards.

A POMDP-SDS generally works as follows. At each turn, a list of Automatic Speech Recognition (ASR) hypotheses with confidences scores (called an ASR n-best list) are observed, which are usually parsed by a Spoken Language Understanding (SLU) unit to obtain an n-best list of semantic representations (a.k.a dialogue acts). After this, a distributional representation of dialogue states (comprising user's goal and dialogue history), called a belief state, is maintained by a dialogue manager (DM), which has a dialogue state tracking model to update the belief at each turn of a dialogue based on the SLU outputs and the previous system action.

The dialogue policy, as part of the DM, determines the next system action in semantic representation, which is then realised by a Natural Language Generation (NLG) module and is read to the user by a Text-to-speech (TTS) synthesiser.

The below discussion will often refer to two exemplar domains—restaurants and laptops, comprising an ontology with a plurality of different slots and values. These domains are examples only and it is to be understood that the methods discussed are applicable to a wide range of domains with different ontologies.

The semantic representations in SDS normally consist of two parts, a communication function (e.g. inform, deny, confirm, etc.) and (optionally) a list of slot-value pairs (e.g. food=Chinese, pricerange=expensive, etc.). The prior knowledge defining the slots and their possible values in a particular domain is called the domain ontology. Dialogue policy optimisation can be solved via Reinforcement Learning (RL), where the goal is to estimate a quantity Q(b, a), for each b and a, reflecting the expected cumulative rewards of the system executing action a at belief state b. Due the exponentially large state-action space an SDS can incur, function approximation is necessary, where it is assumed that $$Q(b,a) \approx f_\theta(\varphi(b,a)) \quad (1)$$

where $\theta$ is the model parameter to learn, and $\varphi(\cdot)$ is a parameter function that maps (b, a) to a parameter vector.

To compute Q(b, a) in Eq. (1), one can either use a summary belief to parameterise the original b for dimension reduction or apply the full belief if kernel methods are used. But in both cases, the action a will be a summary action to achieve tractable computations. Typically, a summary action simplifies the semantic representations that form the master action a, and can be mapped back to the master action based on some pre-defined rules. A more detailed explanation on action summarisation is given below.

Looking now at how summary actions can be derived from their corresponding master actions, assuming that according to its communication function, a system action a can take one of the following forms, a( ) (e.g. reqmore( ), hello( ), thankyou( ), etc.), a(s) (e.g. request(food)), a(s=v) (e.g. confirm(area=north)), $a(s=v_1,s=v_2)$ (e.g. select (food=Chinese, food=Japanese)), and $a(s_1=v_1,s_2=v_2, \ldots, s_n=v_n)$ (e.g. offer(name="Peking Restaurant", food=Chinese, area=centre)), where a stands for the communication function, $s_x$ and $v_x$ denote slots and values respectively. It can be imagined that usually it is unnecessary for the system to address a hypothesis less believable than the top hypothesis in the belief (or the top two hypotheses in the 'select' case). Therefore, the actual values in system actions can be abstracted as, $a(s=b_s^{top})$ $a(s=b_s^{top},s=b_s^{second})$ $a(s=b_{joint}^{top})$ where $b_s$ denotes the marginal belief with respect to slot s, $b_{joint}$ stands for the joint belief consisting of multiple slot-value hypotheses, and $b^{top}$ and $b^{second}$ denote the top and second hypotheses of the given $b_x$, respectively. After this abstraction, summary actions can be defined as $a_s$ (for those actions depending on s) and a (for those who do not have any arguments or take a joint hypothesis as its arguments, i.e. independent of any particular slot). Furthermore, one can uniquely map such summary actions back to their master actions, by substituting the respective top (and second if necessary) hypotheses in the belief into the corresponding slots.

Based on the above definition, the master action a can be re-written as $a_s$, where s denotes the slot that a depends on when summarised. Here, s is fully derived from a and can be null (when the summary action of a is just a). A conventional form of $\varphi$ can be expressed as $$\varphi(b,a_s) \triangleq \delta(a_s) \otimes \psi(b) \quad (2)$$

where $\delta$ is the Kronecker delta, $\psi(\cdot)$ parameterises the belief state, and $\otimes$ is the tensor product. Without losing generality, one can assume that the communication functions a are domain-independent. However, since the slots s are domain-specific (defined by the ontology), both $a_s$ and b will be domain-dependent.

Making $\psi(b)$ domain-independent can be trivial. Suppose that b consists of a set of individual belief vectors (this is a commonly used strategy in SDS to actual maintain the belief state), represented as $\{b_{joint}, b_o\} \cup \{b_s\}_{s \in S}$ where $b_o$ denote the sections of the belief state independent of any slots (e.g. the belief over the communication methods, the dialogue history, etc.) and S stands for the set of (informable) slots defined in the domain ontology. It is possible to construct a parameter function $$\psi(b,s) \triangleq \psi_1(b_{joint}) \oplus \psi_2(b_o) \oplus \psi_3(b_s)$$

and let $$\varphi(b,a_s) \triangleq \delta(a_s) \otimes \psi(b,s)$$

where $\oplus$ stands for the operator to concatenate two vectors. After this, as the mechanism in each to $\psi_x$ parameterise its operand $b_x$ can be domain-independent (see below for an example), the resulting overall parameter vector will be domain-general.

The summary action $a_s$ is now the only domain-dependent element in Eq. 2. Each slot s can be parameterised in a domain-general way, by defining $$\varphi(b,a_s) \triangleq \delta(a) \otimes [\varphi_a(s) \oplus \psi_a(b,s)] \quad (3)$$

and the domain dependent of the overall parameter function $\varphi$ will be eliminated. Note here, to make the definition more general, it is assumed that the parameter functions $\varphi_a$ and $\psi_a$ depend on a, such that a different parameterisation can be applied for each a. In order to find a way of constructing $\varphi_a(s)$ it is investigated how each slot is related to completing the underlying task. More concretely, for example, if the underlying task is to obtain user's constraint on each slot so that the system can conduct a database (DB) search to find suitable candidates (e.g. venues, products, etc.), then the slot parameters should describe the potentiality of the slot to refine the search results (reduce the number of suitable candidates) if this slot is filled. For another example, if the task is to gather necessary and optional information to execute a system command (e.g. setting a reminder or planning a route), where the number of values of each slot can be unbounded, then the slots parameters should indicate whether the slot is required or optional. In addition, the slots may have some specific characteristics causing people addressing them differently in a dialogue. For example, when buying a laptop, more likely one would talk about the price first than the battery rating. Therefore, parameters describing the priority of each slot are also necessary to yield natural dialogues. An exemplar list of parameters is provided herein.

TABLE 1

| Domain | Slot | Values | Informable | Requestable |
|---|---|---|---|---|
| Restaurant | food | (91 food types) | Yes | Yes |
| | area | {north, south, east, west, centre} | Yes | Yes |
| | pricerange | {cheap, moderate, expensive} | Yes | Yes |
| | name | (111 restaurant names) | Yes | Yes |
| | phone | — | No | Yes |
| | postcode | — | No | Yes |
| | signature | — | No | Yes |
| | description | — | No | Yes |
| Laptop | family | {satellite, satellite pro, tecra, portege} | Yes | Yes |
| | purpose | {business, home} | Yes | Yes |
| | pricerange | {budget, moderate, expensive} | Yes | Yes |
| | weightrange | {light-weight, mid-weight, heavy} | Yes | Yes |
| | batteryrating | {exceptional, good, standard} | Yes | Yes |
| | driverange | {large, medium, small} | Yes | Yes |
| | name | (123 laptop models) | Yes | Yes |
| | price | — | No | Yes |
| | drive | — | No | Yes |
| | dimension | — | No | Yes |
| | utility | — | No | Yes |

Table 1 illustrates ontology definitions for the restaurant search and laptop sale domains. Informable slots mean that user can provide values for those slots, and requestable slots mean that user can ask information for those slots.

The underlying tasks of the both above problems can be regarded as DB search. Table 1 gives the detailed ontology definitions of the two domains. Before explaining how the slots in the two example domains can be parameterised into a common representation, the following notations for the convenience of reference will firstly be introduced. Let $V_s$ denote the set of the values that a slot s can take, and $|V_s|$ be the size of $V_s$. Assume that $h=(s_1=v_1 \wedge s_2=v_2 \ldots s_n=v_n)$ is a user goal hypothesis consisting a set of slot-value pairs. DB(h) denotes the set of candidates in the DB satisfying h. In addition, $\lfloor x \rfloor$ is defined as the largest integer less than and equal to x. For each informable slot s defined in Table 1, the following quantities are used for its parameterisation. These quantities are examples only.

Number of values
- e.g. a continuous parameter, $1/|V_s|$, where the normalised quantity is used to make all the parameters have similar value ranges, for numerical stability purposes;
- e.g. discrete parameters mapping $|V_s|$ into N bins, indexed by $\min\{\lfloor \log_2|V_s| \rfloor, N\}$.

Importance e.g. two parameters describing, respectively, how likely a slot will and will not occur in a dialogue.

Priority, e.g. three parameters denoting, respectively, how likely a slot will be the first, the second, and a later attribute to address in a dialogue.

Value distribution in DB, e.g. the entropy of the normalised histogram $(|DB(s=v)|/|DB|)_{v \in V_s}$ Potential contribution to DB search, e.g. given the current top user goal hypothesis h* and a pre-defined threshold τ, How likely filling s will reduce the number of matching DB results to below τ, i.e. $|\{v:v \in V_s, |DB(h^* \wedge s=v)| \leq \tau\}|/|V_s|$.

How likely filling s will not reduce the number of matching DB records to below τ, i.e. $|\{v:v \in V_s, |DB(h^* \wedge s=v)| \leq \tau\}|/|V_s|$.

How likely filling s will result in no matching records found in the DB, i.e. $|\{v:v \in V_s, DB(h^* \wedge s=v)=\emptyset\}|/|V_s|$.

The importance and priority parameters may be manually assigned binary values, but ideally, if one has in-domain human-human example dialogues available (e.g. collected from Wizard-of-Oz experiments), such parameter values can be derived from simple statistics on the corpus. In addition, the potential contribution to DB search parameters are only applicable to those slots not observed in the current top user goal hypothesis.

Parameters for summary belief parameters for use with any embodiment according to the present disclosure are defined as follows. For each informable slot s and each of its applicable communication functions a, $\psi_a(b,s)$ extracts the probability of the top marginal hypothesis $b_s^{top}$, the entropy of $b_s$, the probability difference between the top two marginal hypotheses (discretised into 5 bins with interval size 0.2) and the non-zero rate ($|\{v:v \in V_s, b_s(v)>0\}|/|V_s|$). In addition, if the slot is requestable, the probability of it being requested by the user is used as an extra parameter. A similar parameterisation procedure (except the "requested" probability) is applied to the joint belief as well, from which the obtained parameters are used for all communication functions. To capture the nature of the underlying task (DB search), two additional parameters are defined for the joint belief, an indicator $[[|DB(b_{joint}^{top})| \leq \tau]]$ and a real-valued parameter $|DB(b_{joint}^{top})|/\tau$ if the former is false, where τ is the same pre-defined threshold used for slot parameterisation as introduced above. There are also a number of slot-independent parameters applied to all action types, including the belief over the communication methods and the marginal confidence scores of user dialogue act types (communication functions) in the current turn.

FIG. 1 schematically illustrates a spoken dialogue system (SDS). A user 12 verbally engages the SDS in a conversation. The SDS is designed to complete a specific task. This task will generally depend on the domain in which the SDS is employed. Examples of specific tasks for a SDS include booking flights, providing travel information and providing a list of products or establishments fulfilling certain user criteria.

The SDS 10 of FIG. 1 interprets utterances from the user 12 using an automatic speech recognition system 14 and a natural language processor 16. A dialogue manager 18 then receives a representation of the input utterance. The dialogue manager 18 is generally responsible for controlling the flow of conversation with the user and is therefore in charge of choosing a response, or action, to send to the user 12. The output of the dialogue manager is list of instructions to other parts of the dialogue system. The dialogue manager 20 interacts with a database 20 which may store ontology-specific information among other things. Instructions are sent from the dialogue manager 18 to a natural language generator 21, which generates a representation of natural language. A text-to-speech synthesizer 22 then outputs the chosen response as synthesized speech to the user 12.

Figure 2:
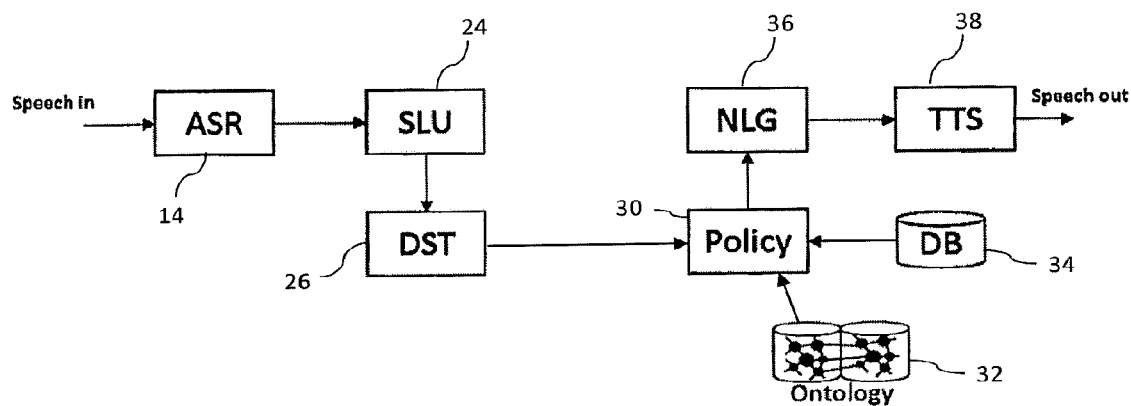
FIG. 2 is a flow chart for a Partially Observable Markov Decision Process spoken dialogue system (POMDP-SDS)

FIG. 2 schematically illustrates a Partially Observable Markov Decision Process SDS (POMDP-SDS). As with all spoken dialogue systems, a POMDP-SDS according to FIG. 2 would be installed in a specific unit for use with a certain domain. The domain is dependent on the industry in which the SDS is installed, and the purpose for which the SDS is being used. For example, the domain may be a specific product, or restaurant, or travel information. Some components of the POMDP-SDS will be specialised and therefore specific to the domain in which the SDS is used in order to provide a tailored service to the user.

Input speech is input to the SDS and is processed by the automatic speech recognition system (ASR) 14 which translates the speech to text. A spoken language understanding (SLU) unit 24 interprets the text to identify meaning and has its output connected to a dialogue state tracker (DST). The DST 26 (also known as a belief tracker) estimates and monitors the user's criteria and history of the dialogue, as interpreted from the user's utterances. The DST 26 feeds this information to the policy 30. In some conventional embodiments, the DST 26 comprises, or is connected to a 'belief summarizer' (not shown). A belief summariser converts the full belief state (which is in the form of a numerical distribution) into a low-dimensional summarized state using numerical methods. This summarized state is—like the full belief state—domain dependent.

The policy 30 defines the behaviour of the dialogue manager (not explicitly illustrated in FIG. 2), by choosing which action is to be taken given the belief state, ontology 32, possible actions and other factors. As such, the policy 30 plays a large part in the efficiency and effectiveness of the SDS. The policy 30 of the SDS of FIG. 2 interacts with the ontology 32. The ontology 32 specifies the entities and interrelationships of the domain. As such, the ontology 32 is domain-dependent. In many task-orientated spoken dialogue systems, the ontology 32 comprises a series of slots, which need to be filled with a value in order to identify which results stored in a database 34 meet the user's criteria. For example, a domain of restaurants may have the slots price, location and type. These slots may comprise the values (i.e. possible answers to allocate to each slot) high, medium or low; central, north or south; and French, Chinese or Indian, respectively. The slots of the ontology 32 are input into the policy 30.

The policy 30 of the SDS in FIG. 2 takes the slots of the ontology 32 as inputs and is optimised to maximise a certain performance indicator for this specific domain and ontology 32. Optimisation of a policy may comprise adapting the policy to increase the success rate or the average reward. Optimisation may comprise adapting a policy such that the action with the maximum expected reward can be selected at each dialogue turn. For these reasons, an optimised policy 30 according to the prior art is domain dependent as it can only work effectively with the ontology of a specific domain.

The optimisation process usually comprises repeatedly using a dialogue manager comprising the policy, in a domain with the ontology for which it should be optimised. The dialogue manager is normally run repeatedly either with real or simulated humans and the policy is adapted to increase the performance indicators discussed above. As the policy needs to be used lots of times, typically thousands, this is an expensive and time consuming exercise.

An example of an optimisation process is the Gaussian Process Temporal Difference (GPTD). This optimisation process may also be used with embodiments of the present disclosure.

A common task for a spoken dialogue system is to output a list of results which match a user's requirements. For example, if the domain is restaurants, the SDS may be used to generate a list of possible restaurants that meet the user's criteria in the price, location and type slots. The list of restaurants output are the results. The results may be embodied as slots, or values of a slot, of the ontology.

A Natural Language Generation (NLG) unit 36 receives instructions from the policy 30 and produces text in natural language for outputting. A text-to-speech (TTS) unit 38, then generates the speech that is output from the dialogue system.

Figure 3:
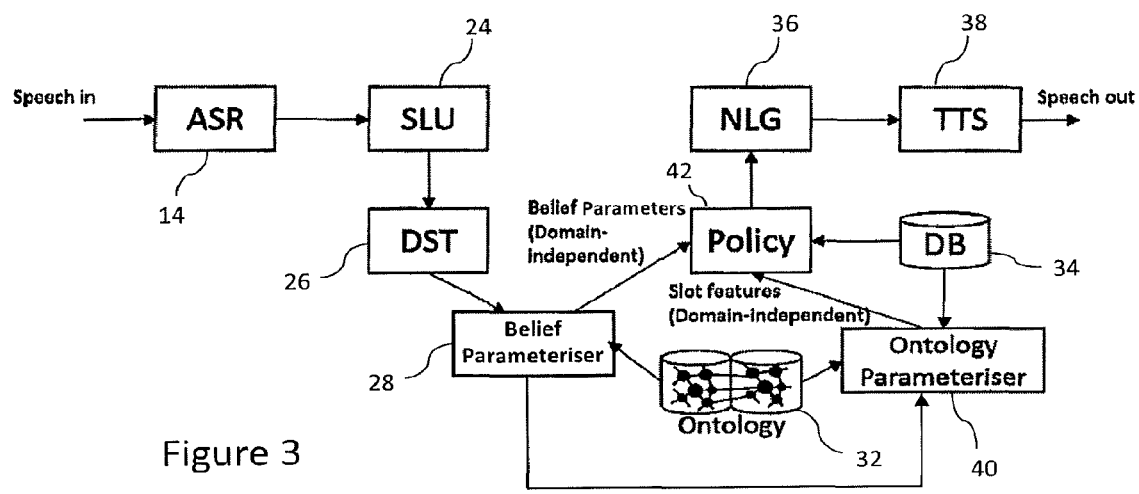
FIG. 3 is a flow chart for a Partially Observable Markov Decision Process spoken dialogue system (POMDP-SDS) according to an embodiment.

FIG. 3 schematically illustrates a Partially Observable Markov Decision Process SDS (POMDP-SDS) according to an embodiment. The ASR unit 14, SLU unit 24, DST unit 26, ontology 32, database 34, NLG unit 36 and TTS unit 38 of FIG. 3 perform an analogous role in the embodiment of FIG. 3 as in that for FIG. 2 and so will not be discussed in detail.

The spoken dialogue system of FIG. 3 is similar in operation to that of FIG. 2. However, the spoken dialogue system of FIG. 3 has a policy 42 that is domain-independent. Furthermore, the system comprises an ontology parameteriser 40 and a belief parameteriser 28. The ontology parameteriser 40 and belief parameteriser 28 may be implemented by a processor in a controller. Unlike that of FIG. 2, the policy 42 of the embodiment of FIG. 3 is domain independent. As such, the policy 42 is able to effectively work with a plurality of different domains with different ontologies. The belief parameteriser 28 operates between the DST 26 and the policy 42. The belief parameteriser 28 defines the belief states in ontology-independent parameters such that they can be used as inputs for, or be operated on by, the policy. The ontology parameteriser 40 effectively sits between the domain-independent policy 42 and the domain-dependent ontology 32 and enables the two to interact by defining the slots of the ontology 32 in terms of ontology-independent parameters.

The following discussion in relation to a belief parameteriser 28 is applicable to any embodiment according to the present disclosure. Moreover, the belief parameteriser can be implemented with any policy, provided the policy is configured to receiving ontology-independent parameters as inputs.

The full belief state itself is generally domain-dependent, because it comprises a marginal (i.e. slot-wise) belief for each slot. A full belief state b can be represented in three parts: the joint belief $b_{joint}$, a set of slot-wise beliefs $\{b_s\}$ and other beliefs $b_o$ that are for domain-independent factors, such as dialogue history, communication methods, etc. Each b here is a discrete distribution (a non-negative normalised vector). In addition, there may be a set of (one-dimension) values, each indicating the probability of a slot being requested by a user (e.g. if a user "how much is this laptop'?", then the slot "price" is being requested). Finally, $br_s$ denotes the belief probabilities for slot s being requested.

$b_o$ is domain-independent, and can be used as it is—any parameterisation on it won't affect the domain-dependence of the system.

Further, given a discrete distribution $\tilde{b}$, regardless of its dimension, A few general ontology-independent parameters can be used to define it. These parameters are applicable to any discrete distributions. The following are example parameters:

(1) The maximum probability in $\tilde{b}$ (i.e. the probability corresponding to the top hypothesis)

(2) The entropy of the distribution (3) The probability difference between the top two hypotheses (in one implementation this value was discretised into 5 bins with interval size 0.2)

(4) Non-zero rate: proportion of the elements in $\tilde{b}$ that have non-zero probabilities The belief parameteriser 28 applies the above parameterisation to $b_{joint}$, providing a domain-independent parameter vector for the joint belief.

The other domain-dependent components are $b_s$ (and $br_s$). If, when deciding whether to execute an action a, the system only needs to consider the slot s that a depends on (s can be uniquely derived from a) together with the global parameters (the joint belief parameters and other parameters above), and regardless of what's going on for the other slots, then every a will only have the dependence on its uniquely corresponding $b_s$ (and $br_s$). The above parameterisation can then be applied to $b_s$ ($br_s$ is just a number, so that number can simply be used as an additional parameter without being parameterised). The obtained parameters can then be concatenated to the joint belief parameters and the "other" parameters, now the overall belief state parameterisation is ontology-independent. The belief parameteriser 28 undertakes the above steps to provide a parameter definition of the belief state. This can be used an input for the policy 42. This parameter definition of the belief state is updated every time the dialogue state tracker 26 updates the belief state.

The "other" parameters that may be included, include:

(1) Belief probabilities for four communication methods, "byconstraint", "byname", "byalternatives", "finished"; and (2) Merged confidence scores for the user communication functions observed in the current turn.

Unlike a conventional methods employed in a belief summariser, the belief parameteriser 28 defines the belief state in terms of ontology-independent parameters. A belief parameteriser according to any embodiment also converts the full belief state into a low dimensional form, thus reducing the number of dimensions from the full belief state. The output of the belief parameteriser 28 is ontology and domain independent. The belief state, defined in terms of ontology-independent parameters can then be used as an input for the policy 42.

The ontology parameteriser 40 defines the slots of the ontology 32 in terms of domain-independent parameters. These domain-independent parameters are not specific to the ontology and so can be used with multiple ontologies, and therefore domains. With the ontology parameterised 40 effectively translating the slots of the ontology 32 into domain-independent parameters before inputting them into the policy 42, the policy no longer needs to be domain-dependent. As the policy 42 uses domain-independent parameters as inputs, rather than the ontology-specific slots, the policy 42 of the embodiment of FIG. 2 is domain independent. This means that the same policy 42 can be used with a plurality of different ontologies. As such, a policy does not need to be optimised specifically for a single ontology. In other words, a policy optimised for a first ontology can be used with a second ontology, rather than having to optimise a policy specifically for the second ontology. This saves time and expense.

A large number of ontology-independent parameters can be used to define the slots of the ontology, of which the following are examples:

1/N, where N is the number of values that the slot has (i.e. can take);

allocating one of six binary-bins according to min{int [$\log_2(N)$],6}, where N is the number of values that the slot has, e.g. a slot where N=8 would be allocated the following parameter: [0,0,1,0,0,0];

a binary indication of whether the slot must be filled in order to complete the task or satisfactorily meet the user's criteria (0=no, 1=yes);

a binary indication of whether the slot is optional (0=no, 1=yes);

an indication of the priority of the slot, as a scale of (1,2,3) mapped to {[1,0,0],[0,1,0],[0,0,1]};

the entropy of the value distribution in the database for the slot;

if the slot is filled, in conjunction with the current top joint hypothesis:
  proportion of the slot's values resulting in obtained results in the database above a threshold number;
  proportion of the slot's values resulting in obtained results in the database below a threshold number;
  proportion of the slot's values resulting in obtained results in no results in the database meeting the user's criteria;

this parameter will only be non-zero for slots whose current top hypothesis in the belief is null, in other words, when the system believes it hasn't observed any constraints for those slots yet.

An embodiment may use any one, more than one, or none of the above parameters.

In the embodiment of FIG. 3, the above parameters are used to define each slot of the ontology 32, before it is input to the policy 42. As such, the above parameters are used in place of the slots. The main difference between the policy 42 of FIG. 3 and that of FIG. 2 is that the policy 42 of FIG. 3 is configured to use the ontology (and therefore domain) independent parameters as inputs, but is similar to the policy of FIG. 2, in most other respects.

Figure 4:
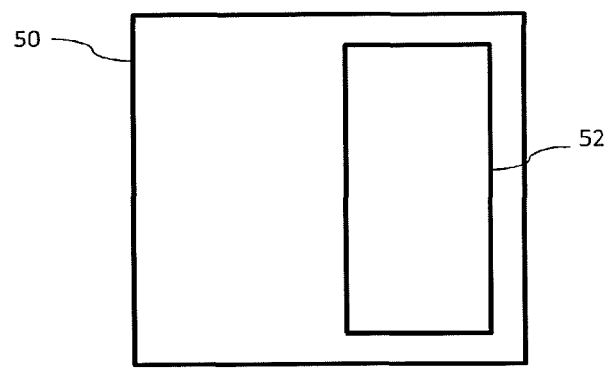
FIG. 4 is an example of a controller according to an embodiment.

FIG. 4 illustrates a controller 50 according to an embodiment. The controller 50 comprises a processor 52. The controller may be implemented in a dialogue manager configured to control the flow of conversation with a user. The controller 50 is configured to implement a parameterised policy for defining the behaviour of the dialogue manager. The parameterised policy is configured to operate with the ontology independent parameters described above as inputs. The processor 52 is configured to define each slot of the end user ontology in terms of at least one of the ontology-independent parameters such that it is suitable for being used as an input to the parameterised policy. As such, the processor 52 parameterises an end user ontology such that the parameterised policy can define the behaviour of a dialogue manager with that end user ontology. The controller 50 of FIG. 4 is suitable to be implemented in a SDS as illustrated in FIG. 1.

Figure 5:
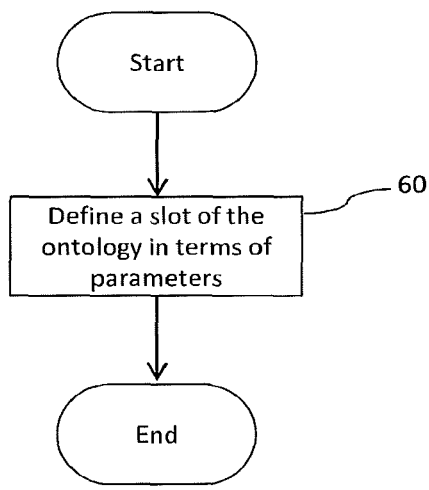
FIG. 5 is a flow chart illustrating a method for making an ontology compatible with an ontology-independent policy.
Figure 6:
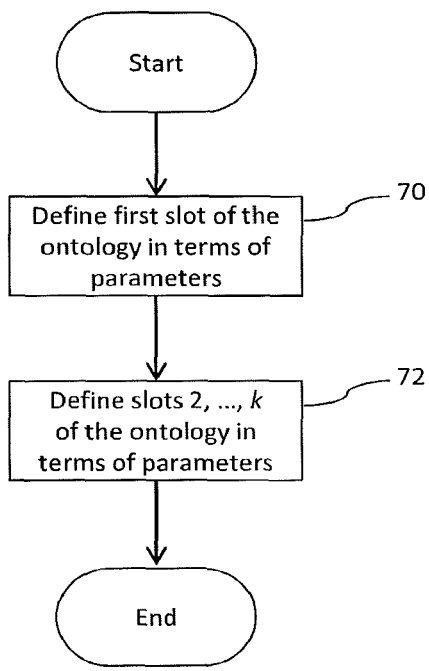
FIG. 6 is a further flow chart illustrating a method for making an ontology compatible with an ontology-independent policy.

FIGS. 5 and 6 illustrate a method according to an embodiment. FIGS. 5 and 6 illustrate a method for making an ontology compatible with an ontology-independent policy configured to operate with ontology-independent parameters as inputs. In the method of FIG. 5, a slot of an ontology which is to be made ontology-independent, for example by a controller according to an embodiment, is defined in terms of ontology-independent parameters 60. This may comprise calculating the above-listed parameters for the slot in question. In FIG. 6, an ontology comprises k slots and each slot of the ontology is defined in terms of parameters. The first slot of the ontology is defined in terms of ontology-independent parameters 70 and the remaining slots, 2–k, are defined in terms of the ontology-independent parameters 72. The ontology-independent parameters may be according to the above list, or may be other ontology-independent parameters. In this way, every slot of the ontology is defined in ontology-independent parameters. Some of the slots are defined in terms of the ontology-independent parameters by calculating a value, as described in the above list of parameters.

Figure 7:
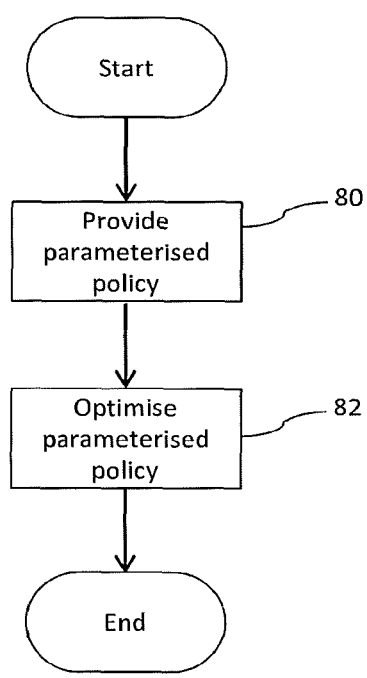
FIG. 7 is a flow chart illustrating a method for providing an optimised ontology-independent policy according to an embodiment.

FIG. 7 illustrates a method for providing an optimised, ontology-independent policy for a dialogue manager. A parameterised policy 80 is provided. The parameterised policy of the embodiment is configured to operate on the ontology-independent parameters in the same way that a policy not according to an embodiment would operate on the slots of the ontology. As such, providing a parameterised policy 80 is effectively to provide a policy that is configured to use parameters instead of slots. The policy may be provided by being developed, or it may installed or applied from an external source. In this or any other embodiment according to the present disclosure, the provision of a parameterised policy may be omitted and may not be part of the embodiment.

Once a parameterised policy has been provided, the parameterised policy is optimised 82. The policy of the embodiment of FIG. 7 is optimised by adapting the parameterised policy for a specific ontology to increase at least one of the success rate or average reward over a value for an unadapted policy. An unadapted policy is one that has not been optimised (i.e. has not been through an optimisation procedure). In alternative embodiments, the policy may be optimised such that the action with maximum expected reward can be selected at each dialogue turn, an action being a choice made by a dialogue manager as to what to do at a certain point. The adaptation is usually done in response to and combination with repetitive use of the policy either with a human user or a computer simulating a human user. The embodiment of FIG. 7 uses Gaussian Process Temporal Difference (GPTD) learning to optimise the parameterised policy, also known as GP-SARSA.

There is a high cost associated with updating the model parameters in order to optimise a policy. This high cost is derived from two main aspects. Firstly, to train a statistical policy, data is required. Data can only be collected on a working system and this first initial system is usually handcrafted (rule-based). Building such a system is expensive. Secondly, when the policy learning process starts, it may be necessary to know whether each dialogue is successful or not. This is the feedback that the policy optimisation algorithm learns from. This feedback can be acquired either by directly asking the user to provide the feedback, or to hire annotators to annotate the data offline. Both of these options incur a labour-cost.

The parameterised policy of FIG. 7 is optimised for a specific ontology 82. This ontology is not necessarily the ontology with which the policy will eventually be used. Embodiments according to the present disclosure allow a policy to be optimised with a first ontology (i.e. a first domain) and implemented in a second domain with a second ontology, with the improvements made during the optimisation period being equally as efficacious in the second domain as the first domain.

In order for the ontology with which the policy is to optimised to be used with the ontology-independent policy, each slot of the ontology is defined in terms of ontology-independent parameters as described above in relation to FIGS. 5 and 6. Once the slots have been defined in terms of ontology-independent parameters, the ontology can be used with the policy in order to optimise the policy.

Figure 8:
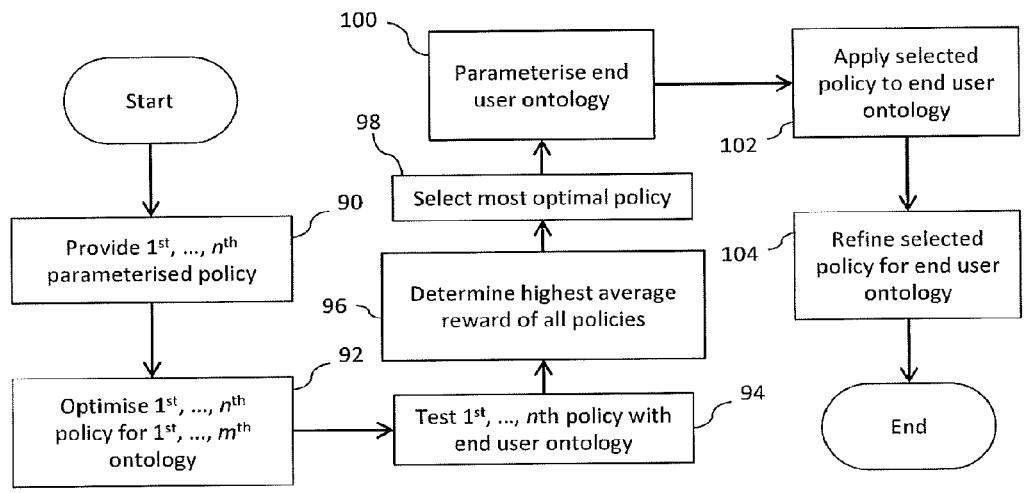
FIG. 8 is a flow chart illustrating a method for providing and refining an optimised ontology-independent policy according to an embodiment.

FIG. 8 is a flow chart schematically illustrating a method of providing an optimised parameterised policy for a dialogue manager. In the method illustrated in FIG. 8, n different parameterised policies are provided 90. The parameterised policies are configured to receiving ontology-independent parameters as inputs. The parameterised policies have not been optimised.

Each of the parameterised policies (1 to n) are then optimised 92. The policies are optimised using the method (s) discussed in relation to FIG. 7. The policies may all be optimised by, or with respect to, the same domain with the same ontology, or by different domains with different ontologies. As the policies are domain-independent, it does not matter if the ontology with which the policy is to be used (the "end user" ontology) is different from that for which it was optimised. In order to be used to optimise the ontology-independent policies, each of the m ontologies must have each of their slots defined in terms of ontology-independent parameters before the optimisation can be undertaken. The parameters may be those discussed above.

Once each ontology is suitable for use with the respective policy it is to optimise, each of the optimised policies is used with the end user ontology 94 (the ontology with which the policy is eventually to be implemented). The 'most optimal' policy for the end user ontology is then determined 96. In the present embodiment, the most optimal policy is that with the highest average reward. In alternative embodiments, the most optimal policy may be that with the highest task success rate, or average of the two values. The most optimal policy is then selected 98 to be used with the end user ontology.

In order to use the parameterised policy with the end user ontology, the end user ontology is parameterised 100. This can be done as described in relation to FIGS. 5 and 6. Once the end user ontology has been parameterised, the policy is applied to the end user ontology 102. The policy applied to the end user ontology is then refined 104. The process for refining the selected policy in the embodiment of FIG. 8 is the same process as that used to optimise the policy. Naturally, in order to refine the selected policy it is repetitively used with the end user ontology, rather than a further, unrelated ontology. As the policy applied to the end user ontology has already been optimised, the policy at the start of the refining process 104 is an optimised policy. As such, a comparatively small amount of adaptation is required when compared to that for the optimisation process. The time taken and expense incurred is therefore also comparatively small.

Figure 9:
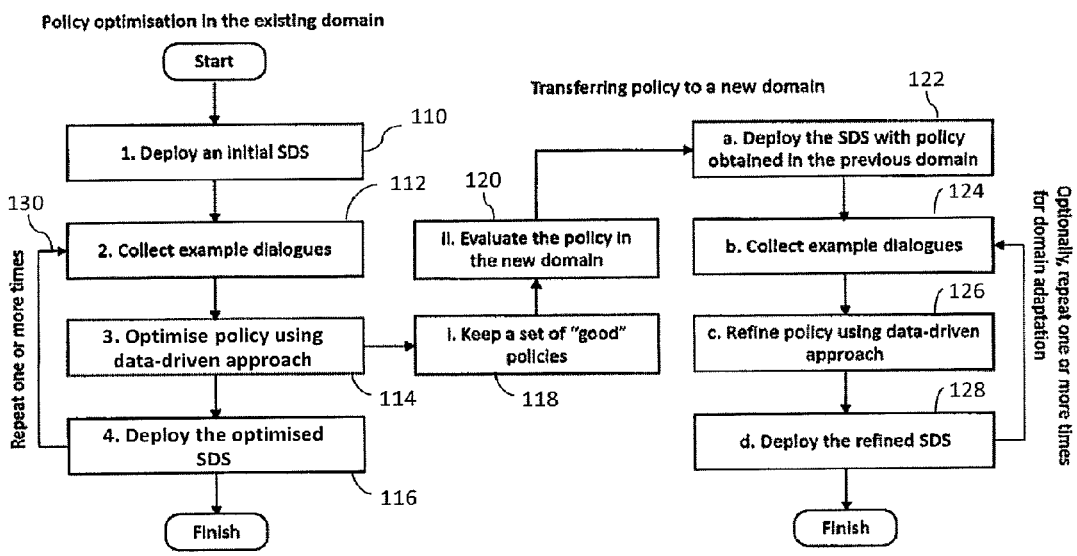
FIG. 9 is a flow chart illustrating a method for transferring a dialogue policy according to an embodiment.

FIG. 9 schematically illustrates a further method for optimising a policy in a first domain with a first ontology and transferring the policy to an end user domain with an end user ontology. An initial SDS is deployed 110 with an ontology-independent policy. This policy is deployed in a first domain with a first ontology. The slots of the first ontology have been defined in ontology-independent parameters so they can be used with the policy. Example dialogues are collected 112 and the policy is optimised 114 as discussed above. The optimised policy can then be deployed 116 as part of an SDS in the domain with the first ontology. Once deployed, an iteration loop 130 may collect further example dialogues 112 to optimise the policy further 114.

Once the policy has been optimised, it may be kept as part of a set of "good" policy or policies 118. The good policy or policies can then be implemented in a new domain with an end user ontology and their performance evaluated 120. If there are multiple "good" policies, the most optimal for the end user ontology can be selected. The selected policy, or the only "good" policy is then deployed with the end user ontology 122.

Example dialogues are collected for the deployed policy 124 and the policy is further refined 126 using equivalent methods as those for optimising the policy. In alternative embodiments, the policy may be refined using a different method to that used to optimise the policy. Once the policy has been refined, it is deployed in an SDS in the domain with the end user ontology 128.

By directly deploying a dialogue policy optimised in a restaurant search domain to laptop sales domain, a 98% task success rate and 12.16 average reward has been achieved. This performance is equivalent to the performance of the policy optimised directly in the laptop sale domain based on around 2000 example dialogues, and is very close to the performance of the policy fully optimised in the laptop sale domain based on 5000 example dialogues (98% success rate, 12.46 average reward).

While certain embodiments have been described, these embodiments have been presented by way of example only, and are not intended to limit the scope of the inventions. Indeed the novel method, controller and dialogue manager described herein may be embodied in a variety of other forms; furthermore, various omissions, substitutions and changes in the form of the method, controller and dialogue manager described herein may be made without departing from the spirit of the inventions. The accompanying claims and their equivalents are intended to cover such forms of modifications as would fall within the scope and spirit of the inventions.

The invention claimed is:

1. A controller for a dialogue manager, the dialogue manager being configured to receive a representation of an input utterance from a user and control the flow of conversation with the user; wherein the controller is configured to implement a parameterised policy for defining the behaviour of a dialogue manager; wherein the parameterised policy is configured to operate with an ontology-independent parameter as an input; and the controller comprises:
a processor configured to
parameterise an end user ontology such that the parameterised policy can define the behaviour of a dialogue manager for the end user ontology,
define a slot of the end user ontology in terms of at least one of the ontology-independent parameters such that it is suitable for being used as an input to the parameterised policy,
apply the parameterised policy to define the behaviour of a dialogue manager operating in a domain with the end user ontology, wherein the dialogue manager is configured to receive a representation of an input utterance from a user and control the flow of conversation with the user,
refine the parameterised policy for the end user domain using a data-driven policy adaptation process; wherein a data-driven policy adaptation process includes using the dialogue manager operating in a domain with the end user ontology with at least one user or simulated user and adapting the parameterised policy to increase at least one of task success rate and average reward.

2. The controller according to claim 1, wherein the parameterised policy is optimised for a first ontology; wherein optimising a policy comprises adapting the policy for a specific ontology to increase at least one of the success rate or average reward over a value for an unadapted policy.

3. The controller according to claim 2, wherein the first ontology is different to the end user ontology.

4. The controller according to claim 1, wherein an ontology-independent parameter is determined by the number of possible values for the slot of the end user ontology.

5. The controller according to claim 1, wherein an ontology-independent parameter is determined by whether the slot of the end user ontology must be filled for the parameterised policy to meet a user's requirements.

6. The controller according to claim 1, wherein an ontology-independent parameter is determined by the priority of the slot of the end user ontology.

7. The controller according to claim 1, wherein the processor is configured to receive data from a database; and the determination of the ontology-independent parameter is dependent on the data from the database.

8. The controller according to claim 7, wherein the data from the database comprises the entropy of the value distribution for the slot of the end user ontology; and an ontology-independent parameter is determined by the entropy of the value distribution for the slot.

9. The controller according to claim 7, wherein
the policy is configured to identify a number of results, equal to or below a threshold number of results, as meeting a user's criteria;
the data from the database comprises the proportion of the values for the slot which, if selected, would result in a number of results equal to, or below, a threshold number of results being identified as meeting the user's criteria; and
an ontology-independent parameter is determined by this data.

10. The controller according to claim 1, wherein
the processor is for parameterising an end user ontology and a belief state such that the parameterised policy can define the behaviour of a dialogue manager for the end user ontology; and wherein
the processor is further configured to:
define a belief state in terms of at least one of the ontology-independent parameters such that it is suitable for being used as an input to the parameterised policy.

11. A dialogue manager configured to receive a representation of an input utterance from a user and control the flow of conversation with the user, the dialogue manager comprising a controller according to claim 1.

12. A method for providing an optimised, ontology-independent policy for a dialogue manager configured to receive a representation of an input utterance from a user and control the flow of conversation with the user, the method comprising:
providing a parameterised policy for defining the behaviour of a dialogue manager, wherein the parameterised policy is configured to operate with ontology-independent parameters as inputs;
optimising the parameterised policy for a first ontology; wherein a slot of the first ontology is defined in terms of at least one of the ontology-independent parameters such that it is suitable for being used as an input to the parameterised policy;

optimising the parameterised policy comprises:

adapting the parameterised policy for a specific ontology to increase at least one of the success rate or average reward over a value for an unadapted policy;

parameterising an end user ontology; wherein parameterising an end user ontology comprises:

defining a slot of the end user ontology in terms of at least one of the ontology-independent parameters, such that it is suitable for being used as an input to the parameterised policy; and applying the parameterised policy to define the behaviour of a dialogue manager operating in a domain with the end user ontology; wherein the dialogue manager is configured to receive a representation of an input utterance from a user and control the flow of conversation with the user;

refining the parameterised policy for the end user domain using a data-driven policy adaptation process;

wherein a data-driven policy adaptation process comprises:

using the dialogue manager operating in a domain with the end user ontology with at least one user or simulated user and adapting the parameterised policy to increase at least one of task success rate, average reward or mean of the two.

13. The method according to 12, the method further comprising:

providing a further parameterised policy configured to operate with ontology-independent parameters as inputs; and optimising the further parameterised policy for a second ontology;

wherein a slot of the second ontology is defined in terms of at least one of the ontology-independent parameters such that it is suitable for being used as an input to the further parameterised policy; and optimising the further parameterised policy comprises:

adapting the parameterised policy for a specific ontology to increase at least one of the success rate or average reward over a value for an unadapted policy; and the method further comprises:

testing the parameterised policy and further parameterised policy in a dialogue manager for an end user ontology to identify the most optimal parameterised policy for the end user ontology; wherein the dialogue manager is configured to receive a representation of an input utterance from a user and control the flow of conversation with the user; and the most optimal parameterised policy is that which has the highest success rate, average reward value or mean of the two.

14. A non-transitory computer readable carrier medium carrying computer executable instructions which, when executed on a processor, cause the processor to carry out a method according to claim 12.

15. The method according to claim 12, the method further comprising: parameterising a belief state; wherein parameterising a belief state comprises: defining a belief state in terms of at least one of the ontology-independent parameters such that it is suitable for being used as an input to the parameterised policy.

* * * * *